United States Patent
Öun

Patent Number: 5,083,993
Date of Patent: Jan. 28, 1992

[54] SYNCHRONIZING ARRANGEMENT FOR A PLANETARY GEAR

[75] Inventor: Mikael Öun, Norsborg, Sweden

[73] Assignee: Saab Scania Aktiebolag, Sweden

[21] Appl. No.: 597,417

[22] Filed: Oct. 15, 1990

[30] Foreign Application Priority Data

Oct. 19, 1989 [SE] Sweden .............................. 8903444

[51] Int. Cl.⁵ .............................................. F16H 57/10
[52] U.S. Cl. ................................. 475/299; 192/48.91; 192/53 F; 192/53 G; 74/339
[58] Field of Search ............... 192/48.91, 53 F, 53 G; 475/299; 74/339

[56] References Cited

U.S. PATENT DOCUMENTS

| | | | |
|---|---|---|---|
| 2,221,892 | 11/1940 | Orr | 192/53 R |
| 2,331,684 | 10/1943 | Henningsen | 475/299 |
| 3,543,897 | 12/1970 | Lemke et al. | 192/53 R |
| 4,289,223 | 9/1981 | Strehler et al. | 192/48.91 |
| 4,452,094 | 6/1984 | Schetter | 192/48.91 X |
| 4,569,252 | 2/1986 | Harper | 475/299 |
| 4,667,538 | 5/1987 | Larsson | 475/299 |
| 4,677,867 | 7/1987 | Sumihi | 192/48.91 X |
| 4,791,833 | 12/1988 | Sakai et al. | 475/299 |
| 4,821,591 | 4/1989 | Adler | 475/299 X |
| 4,964,505 | 10/1990 | Lutz et al. | 192/53 F |

FOREIGN PATENT DOCUMENTS

| | | |
|---|---|---|
| 1750546 | 1/1971 | Fed. Rep. of Germany . |
| 3225201 | 1/1984 | Fed. Rep. of Germany . |
| 1012482 | 4/1952 | France . |
| 2268986 | 4/1975 | France . |
| 7807692.4 | 7/1978 | Sweden . |
| 1204855 | 9/1970 | United Kingdom . |
| 2121492 | 12/1983 | United Kingdom .............. 475/299 |

Primary Examiner—Leslie A. Braun
Assistant Examiner—Daniel Wittels
Attorney, Agent, or Firm—Ostrolenk, Faber, Gerb & Soffen

[57] ABSTRACT

In a planetary gear (1) with an axially displaceable ring wheel (24), which can be coupled together with coupling rings (10,19) on either side of the planetary gear (1), synchronization rings (16,23) are arranged with external locking teeth. The ring wheel (24) is designed at its axial ends with a number of recesses (30), each accommodating locking bodies (31) which are spring-loaded in the radial direction and which bear against the synchronization rings (16,23) and which, during gear change movements, come to bear against shoulders (38) on the synchronization rings (16,23) in order to transmit axial force action to the synchronization ring (16,23) in question.

15 Claims, 3 Drawing Sheets

SYNCHRONIZING ARRANGEMENT FOR A PLANETARY GEAR

BACKGROUND OF THE INVENTION

The present invention relates to a synchronization arrangement for a planetary gear.

In transmission systems for heavy-duty vehicles, for example trucks, it is known to connect a supplementary gearbox to the main gearbox of the vehicle for the purpose of doubling the number of gear change possibilities. Such a supplementary gearbox usually comprises a planetary gear, by means of which the gear change possibilities of the drive unit can be divided into a low gear range and a high gear range. In the low gear range use is made of gear changing in the planetary gear, while in the high gear range no gear changing takes place in the planetary gear.

It is also known to design such planetary gears with synchronization arrangements for the purpose of facilitating gear changing during running. The positioning of the synchronization arrangements and the coupling members necessary for the gear change maneuvering may vary.

In one embodiment, which is advantageous from the point of view of power distribution, the ring wheel of the planetary gear constitutes a coupling muff which, by means of axial displacement, can be brought into engagement with coupling rings on either axial side of the planetary gear. An embodiment of this type is described in greater detail in Swedish Patent Specification SE 453,379 (and corresponding specifications U.S. Pat. No. 4,821,591 and EP 0,239,555).

In this embodiment, a number of tangentially directed springs effect a rotation, limited relative to the ring wheel, of the synchronization rings in such a way that locking teeth arranged on these assume, during a synchronization phase, a position which locks the gear movement.

In contrast, when synchronous rotation has been achieved, it is possible, under the counteraction of the springs, to turn the synchronization rings and move the ring wheel/coupling sleeve axially for coupling together with a coupling ring.

One disadvantage of this embodiment is that the springs act only in one direction, and as a result of this a predetermined direction of rotation is assumed. When the planetary gear is used as illustrated as a supplementary gearbox, this means that synchronization is only possible when driving forwards and, therefore, not when reversing. The possibilities of using a planetary gear of this type in other applications are limited, for example in a gearbox consisting of several planetary gears with alternating directions of rotation. This known planetary gear is also disadvantageous from the manufacturing and assembly point of view, which also means that it is a relatively expensive solution.

Patent application Ser. No. 7807692-4 describes another embodiment in which each of the synchronization rings is connected to a plate collar designed with axial, resilient tongues. These tongues engage in internal circumferential grooves in the ring wheel and are intended, on the one hand, to connect the ring wheel to the respective synchronization ring with a locking effect and, on the other hand, to dampen relative vibratory movements between the ring wheel and the synchronization rings. The formation of grooves in the ring wheel encroaches on its cog tracks, which must therefore be made correspondingly larger in the axial direction, and this means that the dimensions of the whole transmission increase in the axial direction.

Patent Specification DE 1,750,546 describes another embodiment in which the synchronization rings are designed with a number of radial shoulders engaging recesses formed for this purpose on the inside of the ring wheel. By means of designing the recesses with a longer extent than the shoulders in the peripheral direction, the synchronization rings are afforded a certain possibility of rotation relative to the ring wheel. However, no further details are given on how this relative rotation possibility takes place. The formation of the internal recesses in the ring wheel limits the ring wheel cogs to a corresponding extent. In order to ensure engagement between ring wheel and planet wheels under all circumstances, the recesses must be positioned at a sufficient distance axially from the planet wheels. This results in the ring wheel having a long axial extent.

In both the abovementioned embodiments the ring wheel can be connected to the output shaft in order to obtain direct gear. This is disadvantageous from the point of view of power distribution since the gear is then subjected internally to high forces.

SUMMARY OF THE INVENTION

The aim of the present invention is to provide a synchronization arrangement for a planetary gear which does not have the abovementioned disadvantages of the known solutions. The invention therefore relates to a planetary gear which is advantageous from the point of view of power distribution, permits a short axial length, permits synchronized gear changing independently of the direction of rotation, permits simple and inexpensive manufacture and assembly and also prevents gear changing from being carried out completely before synchronous running has been obtained. These aims are achieved according to the invention by virtue of the fact that the planetary gear is designed with the features mentioned below.

The synchronizing arrangement for a planetary gear according to the invention is now described. It has a sum wheel and a plurality of planet wheels arrayed around the sun wheel. A first coupling ring is at one axial side of the planet wheel and a second coupling wheel is at the opposite axial side. The coupling rings are rotatable at different relative speeds with respect to one another as one coupling ring is engaged for each gear ratio. An axially displaceable ring wheel is axially displaceable into selective engagement with one or the other of the coupling rings and also engages the planet wheel, and the respective engagement of the ring wheel with one or the other of the coupling rings establishes the different gear ratios.

There is a first synchronization ring at the first coupling ring and a second synchronization ring at the second coupling ring. Each synchronization ring and its cooperating coupling ring have respective engageable friction surfaces which, when engaged, cause the engaged synchronization ring and coupling ring to rotate together synchronized at the same speed. Then an engagement blocking means, which had previously prevented such coupling taking place, permits the coupling of the ring wheel with the coupling ring by axial movement of the ring wheel when the speeds of the ring wheel, coupling ring and synchronization ring are synchronized.

The distinguishing feature of the invention relates to the means which operatively connects the ring wheel with a selected one of the synchronization rings for causing the frictional coupling between that synchronization ring and the respective coupling ring. In particular, the ring wheel has a respective plurality of recesses arrayed around it and located axially toward each of the synchronization rings, and each recess holds a locking body that is in the form of a ball. A spring on the ring wheel urges the ball radially toward the respective synchronization ring. A respective generally radially oriented shoulder on the synchronization ring is engaged by each of the locking bodies as the ring wheel axially approaches the synchronization ring, and the engaging locking body urges the synchronization ring against the respective coupling ring for bringing the ring wheel, the synchronization ring and the coupling ring into synchronized rotation. Thereafter, the ring wheel and the respective coupling ring may be firmly coupled by cooperating coupling teeth on both of them for continued rotation in the selected gear setting.

In a preferred embodiment, the spring that presses radially on the locking bodies for urging them radially inwardly toward the synchronization ring comprise a spring which is oriented tangentially to the ring wheel, is attached to the ring wheel generally at the circumferential middle of the spring and has ends which press upon the locking bodies at two locations that are spaced circumferentially away from the middle of the spring for urging the locking bodies radially inwardly toward the synchronization ring.

Other features of the arrangement are described in detail in connection with a description of the preferred embodiment.

By means of arranging the locking bodies according to the invention in recesses in the ring wheel, it is possible, during gear movements, to obtain an axial power transmission from the ring wheel to the synchronization ring in question, which is then turned in a manner known per se in such a way that its locking teeth prevent gear movement until synchronous rotation has been obtained. The machining necessary to form the recesses is simple and can be carried out at low cost in conventional machine tools. Similarly, the components included are of simple design, which all in all means that the whole arrangement is inexpensive. By virtue of the fact that the recesses are formed directly in the ring wheel, no extra space is required either in the axial or radial direction, which means that the whole planetary gear can be made compact.

BRIEF DESCRIPTION OF THE DRAWINGS

Further features and advantages of the invention will emerge from the following illustrative description of an advantageous embodiment of the invention. In the description, reference is made to the attached drawings, in which.

DESCRIPTION OF A PREFERRED EMBODIMENT

Figure 1:
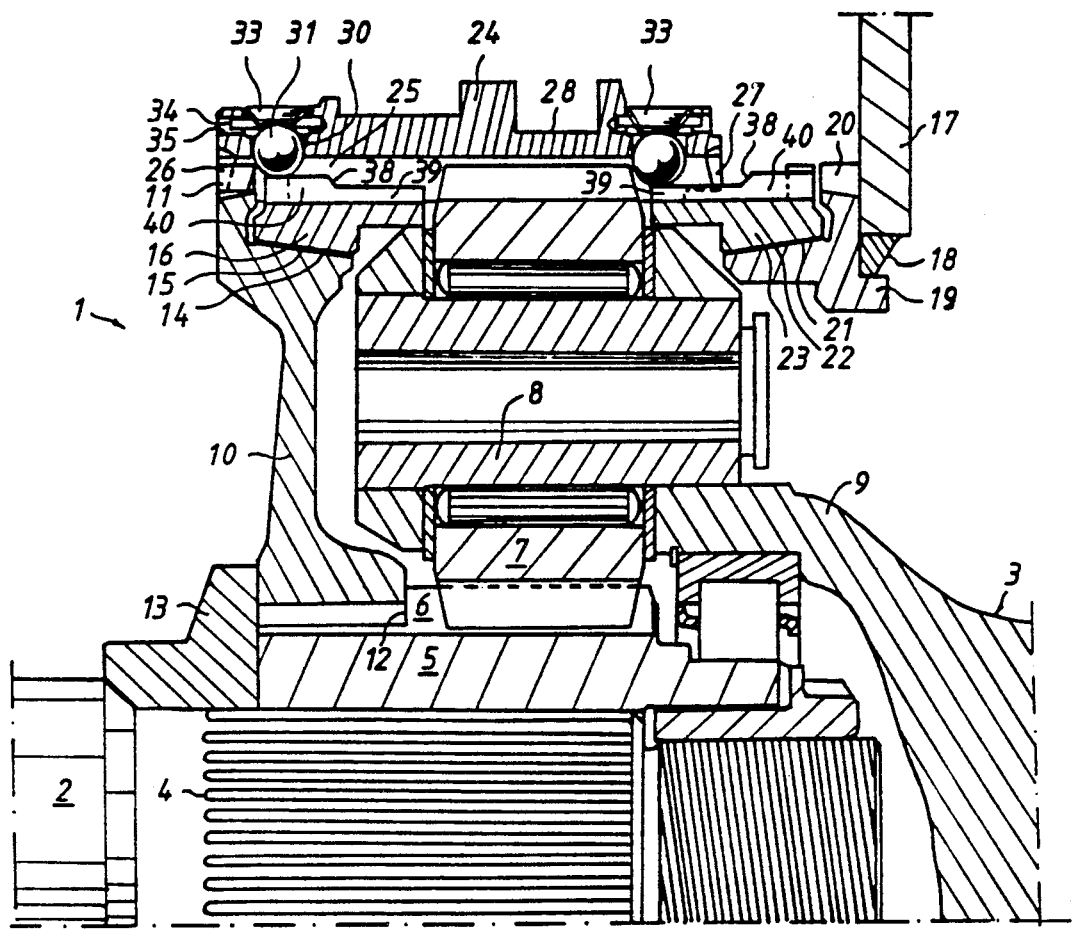
FIG. 1 shows an axial longitudinal section of a planetary gear according to the invention.

A planetary gear 1 according to the invention is illustrated here by a supplementary gearbox intended to be connected to a main gearbox in a heavy-duty vehicle, such as a truck or a bus. The supplementary gearbox comprises a gearbox housing accommodating the planetary gear 1, which is arranged between an input shaft 2 from the main gearbox and an output shaft 3 from the supplementary gearbox.

A sun wheel 5 forming part of the planetary gear 1 is arranged on the input shaft 2 in a rotationally fixed manner by means of spline connections 4, this sun wheel 5 being designed with external teeth 6 which engage in five surrounding planet wheels 7. Each planet wheel 7 is mounted on and supported to rotate around a tubular axle spindle 8 and the spindle is connected to a planet wheel carrier 9 to rotate the carrier 9 as the spindles 8 are rotated around the axis of the wheel carrier 9. This planet wheel carrier 9 is integral with the output shaft 3 of the planetary gear 1. A coupling ring 10 which is designed with external coupling teeth 11 is also arranged in a rotationally fixed manner on the sun wheel 5 by means of teeth engagement. The coupling ring 10 is positioned axially to the sun wheel 5 between a bevelled edge 12 of the sun wheel 5 and a support ring 13 arranged on the input shaft 2. The coupling ring 10 is also designed with a radially outward-directed conical friction surface 14 which is designed to cooperate with a corresponding inward-directed conical friction surface 15 on a synchronization ring 16.

Figure 2:
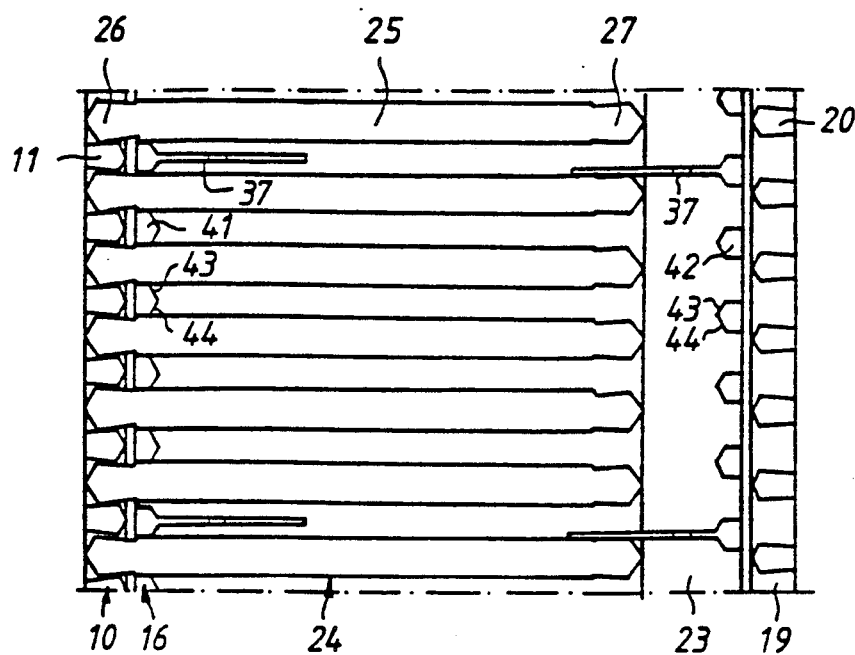
FIG. 2 shows a diagrammatic view of cooperating coupling teeth for synchronization and coupling.

The gearbox housing consists of two halves and in the dividing plane between them there is secured, by means of a number of guide pins and bolt connections, an annular reaction plate. 17 which is designed with a center hole. At the said center hole a coupling ring 19 designed with external coupling teeth 20 is arranged by means of a weld connection 18. The coupling ring 19 is also designed with an outward-directed conical friction surface 21 which is designed to cooperate with a corresponding inward-directed conical friction surface 22 on a synchronization ring 23. This synchronization ring 23 is designed identical to the previously mentioned synchronization ring 16, these synchronization rings 16, 23 being arranged in the gearbox in a mirror image relative to each other axially on either side of the planet wheels 7. These are surrounded in a conventional manner by a ring wheel 24 which is designed with internal teeth 25 engaging in the planet wheels 7. In addition, the ring wheel 24 is designed with internal coupling teeth 26, 27 at its axial ends, which are designed to cooperate with the coupling teeth 11, 20 of the coupling rings 10, 19. It is advantageous if, as is shown in FIG. 2, the coupling teeth 26, 27 and the teeth 25 of the ring wheel 24 are integral with each other.

Figure 3:
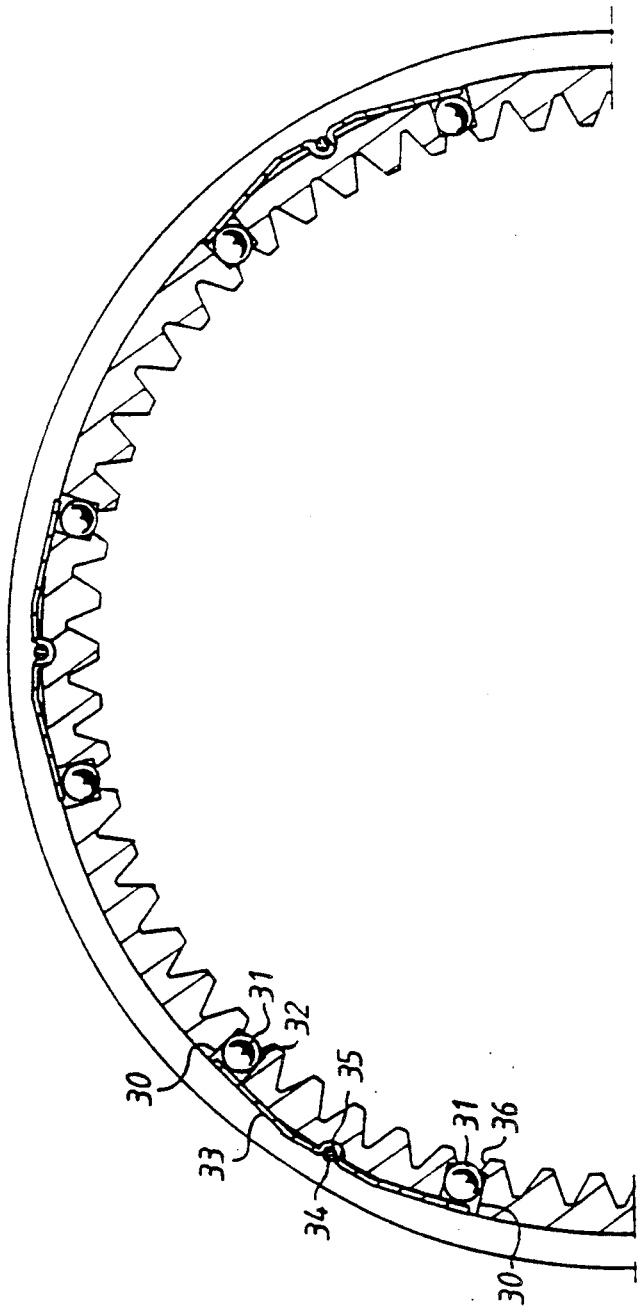
FIG. 3 shows a radial partial section of the ring wheel of the planetary gear.

The ring wheel 24 is mounted displaceable in the axial direction relative to the planet wheels 7. The ring wheel 24 is designed on the outside with an annular groove 28 in which a coupling fork (not shown) engages in order to give the ring wheel 24 an axial displacement during gear changing. The ring wheel 24 is also designed at each of its axial ends with an even number of recesses, for example twelve, which are here illustrated as radial holes 30 which are distributed in pairs at uniform angles around the periphery of the ring wheel 24, as shown in FIG. 3. Each hole 30 accommodates a locking body, advantageously in the form of a ball 31. Each ball 31 is pressed radially inwards under the action of a spring member. In this example, the spring member is an essentially tangentially-directed plate spring 33, which at its respective ends bears against two balls 31 lying close to each other. The plate spring 33 is secured at its middle by means of an axial key 34 accommodated in an axial hole 35 arranged for this purpose in the ring wheel 24. In this example, in which there are twelve balls 31 at each end of the ring wheel 24, there are therefore six plate springs 33 at each end of the ring wheel 24.

As also emerges from FIG. 3, the holes 31 in the ring wheel 24 are oriented in the center of the tooth apertures 36. In addition, the holes 30 are designed with a bottom 32 which holds the balls 31 in the respective hole 30, but which nevertheless allows part of the respective ball 31 to project out into the corresponding tooth aperture 36. At the tooth apertures 36, which in this way are designed with balls 31, the two synchronization rings 16, 23 are designed with axially extending bars 37. However, these bars 37 have a narrower profile shape than the respective tooth aperture 36, and this means that the synchronization rings 16, 23 can move relative to the ring wheel 24 with a certain rotatable play.

In the radial direction, the respective bars 37 of the synchronization rings 16, 23 have a shoulder 38 which divides an axially inner part 39 from an axially outer part 40. As can be seen in FIG. 1, the inner part 39 has a smaller radius than the outer part 40. In the mounted state, as seen in FIG. 1, the balls 31 bear under the action of the plate spring 33 against the bars 37 of each synchronization ring 16, 23. The balls 31 on the right-hand side bear against the inner part 39 of the right-hand synchronization ring 23, while the balls 31 on the left-hand side bear against the outer part 40 of the left-hand synchronization ring 16.

The synchronization rings 16, 23 are moreover designed with external locking teeth 41, 42 which, during the synchronization procedure, in a conventional manner lock the gear-change movement until synchronous rotation has been achieved. The locking teeth 41, 42 have a pointed shape at their axial surfaces facing towards the ring wheel 24 and are designed with oblique edges 43, 44, but otherwise have the same profile shape as the internal tooth apertures 36 of the ring wheel 24.

The function of the planetary gear 1 described is as follows. FIGS. 1 and 2 show the planetary gear 1 with its high gear range engaged. The left-hand coupling teeth 26 of the ring wheel 24 engage with the coupling teeth 11 on the left-hand coupling ring 10, the ring wheel 24 being coupled in a rotationally fixed manner to the sun wheel 5 and the input shaft 2. Because the planet wheels 7 do not rotate around their spindles 8 in this gear range, the output shaft 3 thus comes to rotate at the same speed as the input shaft 2. When engaging the low gear range of the planetary gear 1, the ring wheel 24 is displaced axially by means of the coupling fork engaging in the groove 28. In FIGS. 1 and 2, this displacement is effected to the right. Assuming that the change of gear from the high gear range to the low gear range is carried out during running, in the high gear range the ring wheel 24 rotates at a certain speed, while the right-hand coupling ring 19, which is connected in a fixed manner to the gearbox housing, does not rotate.

Before the low gear range can be engaged, the rotation of the ring wheel 24 must be braked. In the high gear range the rotation of the ring wheel 24 is assumed to have a direction corresponding to an upward movement in FIG. 2. Upon displacement of the ring wheel 24 towards the right in FIG. 2, after a certain displacement the coupling teeth 26 of the ring wheel 24 on the left-hand side are disengaged from the left-hand coupling ring 10 and, thus, disengaged from the input shaft 2. At the same time the balls 31 on the right-hand side of the ring wheel 24, which during the start of the gear-change process bear against the inner part 39 of the respective bar 37 of the right-hand synchronization ring 23, come to bear against the respective shoulder 38 on the synchronization ring 23. In this way the ring wheel 24 exerts via the balls 31 an axial force on the synchronization ring 23, which results in its conical friction surface 22 coming to bear in a sliding manner against the corresponding friction surface 21 on the right-hand coupling ring 19. The synchronization ring 23 is thus subjected to a braking moment, which means that it is turned relative to the ring wheel 24 to a position in which the locking teeth 42 on the ring 23 block the continued axial displacement of the ring wheel 24. When the coupling teeth 27 of the ring wheel 24 come to bear in this way in a locking manner against the locking teeth 42 of the synchronization ring 23, the ring wheel 24 is also subjected to a braking moment.

After synchronous rotation has been achieved or, as is the matter under consideration here, the rotation of the ring wheel 24 has been braked completely, the axial force which the coupling teeth 27 of the ring wheel 24 exert on the bevelled side surfaces 43, 44 of the locking teeth 42 is sufficient to turn the ring wheel 24 to a position in which the locking teeth 42 fit into the tooth apertures 36 of the ring wheel 24 and no longer prevent the axial movement of the ring wheel 24. The ring wheel 24 can thus be axially displaced to engage with the coupling ring 19 and is coupled together in a rotationally fixed manner with the gearbox housing. The planet wheels 7 are now rotated around their spindles 8 by the rotation of the sun wheel 5 with respect to the ring wheel 24, as the wheels 7 engage both of wheels 5 and 24. Spindles 8 and wheel carrier 9 rotate at a slower rate. The low gear range of the planetary gear 1 is thus engaged and achieves in a manner known per se a gear change between the input shaft 2 and the output shaft 3.

The change from the low gear range back to the high gear range is effected in an analogous manner by means of the ring wheel 24 being displaced towards the left in FIGS. 1 and 2. If the gear change takes place during running, it is necessary to accelerate the ring wheel 24 to the same rotational speed as the input shaft 2. Similarly to what is stated above, it is assumed that the input shaft 2 rotates in a direction which in FIG. 2 corresponds to an upward movement. Thus, in the low gear range, the left-hand coupling ring 10 rotates, while the ring wheel 24 does not rotate. When the ring wheel 24 is displaced towards the left, the locking teeth 41 of the left-hand synchronization ring 16 lock the displacement of the ring wheel 24 until synchronous rotation has been achieved. During the initial stage of the synchronization procedure, the balls 31 on the left-hand side of the ring wheel 24 bear against the corresponding shoulder 38, with the result that the synchronization ring 16, by means of a sliding bearing between the friction surfaces 14, 15 of the synchronization ring 16 and the coupling ring 10, is subjected to a moment which twists the synchronization ring 16 into a locking position.

After synchronous rotation has been achieved, the synchronization ring 16 and the ring wheel 24 rotate at the same speed as the coupling ring 10. The synchronization ring 16 can in this way be turned relative to the ring wheel 24 into a non-locking position which allows the ring wheel 24 to be axially displaced and coupled to the coupling ring 10.

The moments which, during the gear change procedure, act on the two synchronization rings 16, 23 are always directed in the same direction for each synchronization ring 16, 23 provided that the direction of rotation of the input shaft 2 is always the same. This is the case when driving forwards. In contrast, when reversing, the input shaft 2 rotates in the opposite direction, and the directions of rotation described are thus reversed.

In order to permit synchronized gear changing both when driving forwards and backwards, it is necessary for the oblique edges 43, 44 of the locking teeth 41, 42 to be designed symmetrical, and as shown in attached FIG. 2. In alternative embodiments of the invention, where synchronization is only required in one direction of rotation, it is possible to use locking teeth whose edges 43, 44 are designed asymmetrical.

The planetary gear 1 according to the invention is advantageous from the manufacturing point of view. The necessary machining of the ring wheel 24 can be carried out easily in conventional machine tools. Likewise, the assembly is simple and allows the ring wheel 24 to be completely pre-assembled with balls 31 and plate springs 33 before the planetary gear 1 is assembled. The design according to the invention means that the space requirement of the planetary gear in the axial direction is small, and in the radial direction no extra space is required. Moreover, the design of the planetary gear 1 according to the invention means that the conical friction surfaces 15, 22 and 14, 21 respectively on the synchronization rings 16, 23 and coupling rings 10, 19 respectively can be arranged at a great radial distance from the input and output shafts 2, 3. This means that the moments, which are caused during the synchronization procedure by the friction forces, can attain high values. This in turn means that the dimensions of the friction surfaces 14, 15, 21, 22, particularly in the axial direction, can be kept within low values and that the whole gearbox can be designed relatively short.

The invention can also be modified within the scope of the following patent claims and can be designed other than has been described in the above example.

Thus, the range of use of the planetary gear according to the invention is not limited to that of a supplementary gearbox, but instead it can also be used in other types of gearboxes, for example hydraulic automatic transmissions where a number of planetary gears are coupled together to each other. Similarly, the invention can be used in other configurations of coupling possibilities between the planetary gear parts and the input and output shafts of the gearbox and the gearbox housing.

Furthermore, the invention can also be used in those synchronization arrangements in which there are a number of synchronization rings on either side of the planetary gear.

I claim:

1. A synchronizing arrangement for a planetary gear, wherein
   the planetary gear comprises a sun wheel, means for driving the sun wheel to rotate around a sun wheel axis, the sun wheel having first engaging means thereon which are rotated by the sun wheel; at least one planet wheel outward of the sun wheel and having a spindle about which the planet wheel rotates, the planet wheel having a second engaging means thereon for engaging the first engaging means of the sun wheel, such that rotation of the sun wheel can cause rotation of the planet wheel around the planet wheel spindle; an output shaft connected with the planet wheel spindle, and rotation of the planet wheel around the planet wheel spindle causes rotation of the planet wheel spindle to cause rotation of the output shaft around an output shaft axis;
   the synchronizing arrangement comprises:
   a first coupling ring connected with the sun wheel to continuously rotate with rotation of the sun wheel, the first coupling ring being at one axial side of the planet wheel; a second coupling ring at the opposite axial side of the planet wheel from the first coupling ring, and means connected with the second coupling ring for causing the first coupling ring to rotate relative to the second coupling ring;
   an axially displaceable ring wheel outward of the planet wheel, the ring wheel having an axial length to engage only one of the first and second coupling rings at one time, the ring wheel being axially displaceable sufficiently to engage one of the first and second coupling rings depending upon the axial displacement of the ring wheel, the ring wheel being rotatable around the sun wheel axis;
   a first synchronization ring located axially at the first coupling ring, supported for rotation around the sun wheel axis and rotatable relative to the rotation of the ring wheel around the sun wheel; the first synchronization ring having a first radially outer inwardly facing friction surface and the first coupling ring having a second cooperating radially inner outwardly facing friction surface, and the first and second friction surfaces are adapted to be engaged for bringing the rotation speed of the first synchronization ring to the rotation speed of the first coupling ring when the first and second friction surfaces are in engagement;
   a second synchronization ring located axially at the second coupling ring, supported for rotation around the sun wheel axis and rotatable relative to the rotation of the ring wheel around the sun wheel; the second synchronization ring having a third radially outer inwardly facing friction surface and the second coupling ring having a cooperating radially inner outwardly facing fourth friction surface, and the third and fourth friction surfaces are adapted to be engaged for bringing the rotation speed of the second synchronization ring to the rotation speed of the second coupling ring when the third and fourth friction surfaces are in engagement;
   each of the first and second synchronization rings having respective first and second external locking means thereon for blocking axial displacement of the ring wheel toward the respective one of the first and second coupling rings until the occurrence of synchronous rotation between the ring wheel and the respective one of the first and second coupling rings, for thereby preventing the ring wheel and the engaged coupling ring from rotating at different speeds;
   the ring wheel having a first plurality of recesses arrayed around it axially toward the first synchronization ring and having a second plurality of recesses arrayed around it axially toward the second synchronization ring; a respective first locking body held in each first recess, a respective second locking body held in each second recess; first and second springs positioned on the ring wheel in the first and second recesses, respectively, for acting on the first and second locking bodies in the recesses for urging the locking bodies to bear radially inwardly;

each of the first and second synchronization rings having a respective generally radial shoulder against which the respective first plurality and second plurality of locking bodies bear;

the first plurality of locking bodies bearing against the first shoulder of the first synchronization ring during axial movement of the ring wheel toward the first synchronization ring for transmitting an axial force to the first shoulder, and the first and second friction surfaces being oriented such that the axial force on the first shoulder moves the first synchronization ring to cause friction contact between the first and second friction surfaces for causing the rotation of the first synchronization ring at the rotation speed of the first coupling ring; and the second plurality of locking bodies bearing against the second shoulder of the second synchronization ring during axial movement of the ring wheel toward the second synchronization ring for transmitting an axial force to the second shoulder, and the third and fourth friction surfaces being oriented such that the axial force on the second shoulder moves the second synchronization ring to cause friction contact between the third and fourth friction surfaces for causing the second synchronization ring to have the rotation speed of the second coupling ring.

2. The synchronizing arrangement of claim 1, wherein the first external locking means comprise first external locking teeth at the first synchronization ring extending axially toward the ring wheel for blocking that axial movement of the ring wheel which rotatively couples the ring wheel with the first coupling ring until the ring wheel rotation is synchronous with that of the first coupling ring; and the second external locking means comprise second external locking teeth at the second synchronization ring extending axially toward the ring wheel for blocking that axial movement of the ring wheel which rotatively couples the ring wheel with the second coupling ring until the ring wheel rotation is synchronous with that of the second coupling ring.

3. The synchronizing arrangement of claim 1, wherein each of the locking bodies is in the form of a ball.

4. The synchronizing arrangement of claim 1, wherein each spring in the ring member for acting on a respective locking body comprises a respective plate spring that extends tangentially of the ring wheel and between two circumferentially spaced apart locking body receiving recesses which lie relatively near one another, each plate spring bearing upon a respective locking body toward each opposite circumferential end of the spring; means securing each plate spring to the ring wheel approximately at the middle of the spring between its two respective locking body receiving recesses.

5. The synchronizing arrangement of claim 1, wherein the first coupling ring has first coupling teeth; at the axial end of the ring wheel toward the first coupling ring, the ring wheel having second coupling teeth for engaging the first coupling teeth when the ring wheel is moved axially toward the first coupling ring;

the second coupling ring having third coupling teeth; at the axial end of the ring wheel toward the second coupling ring, the ring wheel having fourth coupling teeth for engaging the third coupling teeth of the second coupling ring when the ring wheel is moved axially toward the second coupling ring;

the first and second coupling teeth being respectively so shaped that upon synchronous rotation between the ring wheel and the first coupling ring, the ring wheel and first coupling wheel rotative orientations being adjustable and the ring wheel then being displaceable for the ring wheel second coupling teeth to axially pass the first external locking means and for the first and second coupling teeth to then engage for the first coupling ring and the ring wheel to rotate synchronously together;

the third and fourth coupling teeth being respectively so shaped that upon synchronous rotation between the ring wheel and the second coupling ring, the ring wheel and second coupling wheel rotative orientations being adjustable and the ring wheel then being displaceable for the ring wheel fourth coupling teeth to axially pass the second external locking means and for the third and fourth coupling teeth to engage for the second coupling ring and the ring wheel to rotate synchronously together.

6. The synchronizing arrangement of claim 5, wherein the first and second coupling teeth on the one hand and the third and fourth coupling teeth on the other hand are cooperatingly beveled at their cooperating axial ends such that the first and second teeth on the one hand and the third and fourth coupling teeth on the other hand, when they first contact axially and throughout the continuing axial movement of the ring wheel toward the respective coupling ring, causes the ring wheel to orient itself with respect to the respective first and second coupling ring to bring the first and second coupling teeth on the one hand and the third and fourth coupling teeth on the other hand selectively into complete engagement.

7. The synchronizing arrangement of claim 6, wherein the first external locking means comprise first external locking teeth at the first synchronization ring extending axially toward the ring wheel for blocking that axial movement of the ring wheel which rotatively couples the ring wheel with the first coupling ring until the ring wheel rotation is synchronous with that of the first coupling ring; and the second external locking means comprise second external locking teeth at the second synchronization ring extending axially toward the ring wheel for blocking that axial movement of the ring wheel which rotatively couples the ring wheel with the second coupling ring until the ring wheel rotation is synchronous with that of the second coupling ring.

8. The synchronizing arrangement of claim 5, further comprising a first plurality of tooth receiving apertures defined in the ring wheel between the second coupling teeth of the ring wheel and a second plurality of tooth receiving apertures between the fourth coupling teeth of the ring wheel, and each of the locking body receiving recesses in the ring wheel being at a respective one of the first and second tooth apertures;

a respective axial bar on each of the first and second synchronization rings at each of the first and second respective tooth apertures, and the axial bar extending axially into the respective tooth aperture, each of the axial bars being of such a circumferential width as to engage in the respective tooth aperture with rotation play.

9. The synchronizing arrangement of claim 8, wherein each of the locking bodies is shaped and positioned to bear against a respective axial bar on the respective synchronization ring axially toward which the respective locking body is disposed.

10. The synchronizing arrangement of claim 9, wherein the shoulders against which the locking bodies bear are defined in the axial bars of the synchronization rings.

11. The synchronizing arrangement of claim 10, wherein the axial bars are shaped to have an axial inner part of smaller diameter and an axially outer part of grater diameter and the shoulder of each axial bar is defined between the axially inner and axially outer parts of the respective axial bar.

12. The synchronizing arrangement of claim 8, wherein each locking body receiving recess is in the form of a respective radial hole defined in the ring wheel, the hole being defined with a radial bottom which is radially inward of the locking body and is shaped for preventing the respective locking body from being pressed by the spring completely radially inwardly and out of the respective radial hole in the ring wheel.

13. The synchronizing arrangement of claim 12, wherein each spring int he ring member for acting on a respective locking body comprises a respective plate spring that extends tangentially of the ring wheel and between two circumferentially spaced apart locking body receiving recesses which lie relatively near one another, each plate spring bearing upon a respective locking body toward each opposite circumferential end of the spring; means securing each plate spring to the ring wheel approximately at the middle of the spring between its two respective locking body receiving recesses.

14. The synchronizing arrangement of claim 1, wherein the means connected to the second coupling ring is for preventing rotation of the second coupling ring.

15. The synchronizing arrangement of claim 1, wherein there are a plurality of the planet wheels arrayed around the sun wheel and the ring wheel.

* * * * *